No. 743,151. PATENTED NOV. 3, 1903.
E. E. CRANDALL.
BOOKKEEPING.
APPLICATION FILED OCT. 27, 1902.
NO MODEL. 2 SHEETS—SHEET 1.

| 298 INVOICE RECORD AND COST BOOK. | Article Number | Invoice Number | Yards Dozens or Grosses | Net First Cost | Secret First Cost | Net First Cost % | A PRINTED AND COLORED COTTON GOODS. | B BROWN BLEACHED AND WHITE GOODS. | B BLEACHED AND WHITE GOODS. | C BLANKETS COMFORTS SHEETS AND LACE CURTAINS. | TOTALS |
|---|---|---|---|---|---|---|---|---|---|---|---|
| 1902 | | | | | | | | | | | |
| March 27 Marshall Field & Co. | | 300 | | | | | | | | | |
| Chicago Ill. | | | | | | | | | | | |
| 1 Bale # Anderson Brown Cotton L L | | | 1000 | 5 | | | | 50 00 | | | |
| 1 Case # Lonsdale Bleached | | | 1000 | 7² | | | | 75 00 | | | |
| 1 Case Crandall Shirtings A | | | 2000 | 3² | | | 70 00 | | | | |
| 2 Bales Comforts | | | | 12 00 | | | | | | 24 00 | |
| 100 lb. Salem Sheets | | | 72/90 | 4 00 | | | | | | 40 00 | |
| 1 Case Fruit Bleached | | | 1000 | 6² | ½ | 7 | | 65 00 | | | 684 00 |
| March 30 Frederick Victor Achelis | | 303 | | | | | | | | | |
| New York. | | | | | | | | | | | |
| 1 Case Cotton Dress Goods LLL | | | 1000 | 7² | | | 75 00 | | | | |
| 1 Blk Alpaca X 40 | | | 500 | 50 | | | 250 00 | | | | |
| March 30 Putnam Hooker Co. | | 305 | | | | | | | | | 325 00 |
| Cincinnati O. | | | | | | | | | | | |
| 40 Gar. Blue Ridge Gray 10/4 | | | | 2 00 | | | | | | 80 00 | |
| 40 Eclipse Red 10/4 | | | | 3 00 | | | | | | 120 00 | 200 00 |
| March 30 Bliss Fabyan Co. | | 306 | | | | | | | | | |
| New York | | | | | | | | | | | |
| 1 Case Bro Dep Sheeting | | | | | | | | | | | |
| 16-10 × 5 40 | | | | | | | | 135 90 | | | 135 90 |
| | | | | | | | | 1020 1359 | | | |

WITNESSES
Chas. L. Hyde.
M. C. Nickelson.

Fig. 1.

INVENTOR
Edwin E. Crandall.
BY Hazard & Harpham.
ATTORNEYS.

THE NORRIS PETERS CO., PHOTO-LITHO., WASHINGTON, D. C.

No. 743,151. PATENTED NOV. 3, 1903.
E. E. CRANDALL.
BOOKKEEPING.
APPLICATION FILED OCT. 27, 1902.
NO MODEL. 2 SHEETS—SHEET 2.

*Fig. 2.*

185
BOOK A. PRINTED AND COLORED COTTON GOODS.

| Page | Name | Invoice Number | Date | Article | Article No | List | Discount | Net First | Freight | Landed Net Cost Gross | Doz | Yard | No | Retail | Whole sale | Remarks |
|---|---|---|---|---|---|---|---|---|---|---|---|---|---|---|---|---|
| 298 | | | 300 | Arnold Shirtings | a | | | 3½ | ¼ | | | 3¾ | 1 | 6½ | 5— | |
| | | | | | | | | | | | | | 2 | | | |
| | | | | | | | | | | | | | 3 | | | |
| 298 | | | 302 | Cotton Dress Goods | LL6 | | | 7½ | 1 | | | 8½ | 4 | 15 | 10 | |
| | | | | Blk Alpaca | X40 | | | 50 | 5 | | | 55 | 5 | 125 | 85 | |
| | | | | | | | | | | | | | 6 | | | |

*Fig. 3.*

182
BOOK B. BROWN BLEACHED AND WHITE GOODS.

| Page | Name | Invoice Number | Date | Article | Article No | List | Discount | Net First | Freight | Landed Net Cost Gross | Doz | Yard | No | Retail | Whole sale | Remarks |
|---|---|---|---|---|---|---|---|---|---|---|---|---|---|---|---|---|
| 298 | | | 300 | Anderson 4/4 Bro Cotton | LL | | | 5 | ¼ | | | 5¼ | 1 | 6¼ | | |
| | | | | Lonsdale Bleached | 4/4 | | | 7½ | ¼ | | | 7¾ | 2 | 8½ | | |
| | | | | Fruit Bleached | 4/4 | | | 7 | ¼ | | | 7¼ | 3 | 8³ | | |
| | | | | | | | | | | | | | 4 | | | |
| | | | | | | | | | | | | | 5 | | | |
| 298 | | | 306 | Pepperell Bro Sheeting | | 16 | 15% | 1350 | 1 | | | 1450 | 6 | 18 | | |

*Fig. 4.*

184
BOOK C. BLANKETS COMFORTS SHEETS AND LACE CURTAINS

| Page | Name | Invoice Number | Date | Article | Article No | List | Discount | Net First | Freight | Landed Net Cost Gross | Doz | Yard | No | Retail | Whole sale | Remarks |
|---|---|---|---|---|---|---|---|---|---|---|---|---|---|---|---|---|
| 298 | | | 300 | Cotton Comforts | DDH | | | 1200 | 100 | | | 1300 | 1 | 1800 | | |
| | | | | Salem Sheets | 72/90 | | | 400 | 32 | | | 432 | 2 | 600 | | |
| | | | | | | | | | | | | | 3 | | | |
| 298 | | | 305 | Blue Ridge Gray Blk | 10/4 | | | 200 | 20 | | | 220 ea | 4 | 3 ea 00 | | |
| | | | | Eclipse Red | 10/4 | | | 300 | 25 | | | 325 | 5 | 500 | | |
| | | | | | | | | | | | | | 6 | | | |

*Fig. 5.*   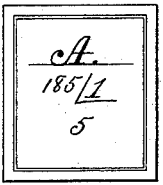   *Fig. 6.*   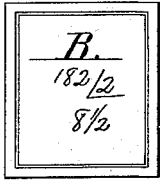   *Fig. 7.*

WITNESSES
Chas. L. Hyde.
No. C. Nickelson.

INVENTOR
Edwin E. Crandall.
BY Hazard & Harpham
ATTORNEYS.

No. 743,151.                                              Patented November 3, 1903.

UNITED STATES PATENT OFFICE.

EDWIN E. CRANDALL, OF LOS ANGELES, CALIFORNIA.

BOOKKEEPING.

SPECIFICATION forming part of Letters Patent No. 743,151, dated November 3, 1903.

Application filed October 27, 1902. Serial No. 129,041. (No model.)

*To all whom it may concern:*

Be it known that I, EDWIN E. CRANDALL, a citizen of the United States, residing at Los Angeles, in the county of Los Angeles and State of California, have invented a new and useful System in Bookkeeping, of which the following is a specification.

My invention relates to bookkeeping where it is required to be able at a moment's notice to turn to an invoice-record book having recorded therein, as hereinafter explained, the price paid for any item of goods included in the inventory or any matter affecting the same which it may not be desirable to disclose to the clerks in the store, and to ascertain quickly the cost of any article on sale in a large mercantile establishment having a number of departments; and the object thereof is to provide a confidential record of all such items which is readily accessible to the proprietor, manager, or other trusted employee and to no one else. I accomplish these objects by means of the system herein described, the necessary books employed therein with the appropriate entries being shown in the accompanying drawings, in which—

Figure 1 is a representation of a page of an invoice-record and cost book embodying my invention; Figs. 2, 3, and 4, representations of three cost-books used in connection with the invoice-record and cost book. Figs. 5, 6, and 7 represent tags for attachment to the various articles a record of which is entered in these books. They form a key by means of which all information in regard to the article to which they are attached can be readily obtained. This information is obtained in this manner:

On the tags are marked the letters "A," "B," "C," &c., to represent the cost-book in which the entries are made of the article to which the tag is attached. On this tag are also marked the page-number and line-number of the cost-book containing these entries and the selling price. By referring to the page-number and line-number given of this cost-book all the information usually desirable to impart to the employees is found; but that information which a proprietor desires shall not be disclosed to his employees will be found in the book of original entry, which I have termed the "invoice-record and cost book," which is accessible only to the proprietor or his confidential employees, and herein is entered the actual cost of every article, the market value thereof, the percentage between the market value and the amount paid therefor, the party from whom the article was purchased, and when any other matter which may effect the price at which it would be advisable to sell the article. In other words, it furnishes the proprietor all the necessary data from which he is enabled to make a special price below the market and below the price quoted by his competitors and still bring him a profit. All this information will appear only in the invoice-record and cost book, and the page-number and original invoice-number where these entries are made in this book of original entry will be given on the page and line of the cost-book referred to on the tag attached to the article itself. The employees know that all this confidential information is disclosed in this book of original entry, and if they are asked to make a special price on any particular article the letter designating the cost-book with the page and line number, as indicated by the tag attached thereto, is sent to the office, and instantly the proprietor refers to this confidential data and fixes a special price in accordance therewith, the employee knowing nothing about the data by means of which the proprietor is enabled to fix this price.

To illustrate the practical working of my system, I will follow the entry of one item through these books and explain the manner in which I can readily ascertain at any time all data with reference to any article in the establishment where my system is employed. On March 27, 1902, to illustrate, I will say I purchase of Marshall Field & Co., Chicago, a lot of goods the invoice of which is transcribed in page 298 of the invoice and record book, (see Fig. 1,) and the number of the invoice given thereto is "300." This is placed in the column under the head-line "Invoice number." Among the articles purchased at this time and included in this invoice is "1 case Arnold shirting," the article bearing the letter "a" to designate the quality of same. It contains two thousand yards net, first cost being three and one-half cents, amounting to seventy dollars. The total cost of this article is placed in the column under the printed head-line "A." This letter indicates the cost-book used in the department having charge of printed and colored cotton goods, which is also printed at the head of the column under the letter "A." It will be seen that proper columns are provided under appropriate head-lines to indicate the various entries that should be made, as aforesaid. This will complete the entries in regard to this article as it appears in the invoice-record and cost book. This item appearing in the column under the head "A" is transferred in regular order of transferring from invoice-record book to various cost-books to page 185 of cost-book A, (see Fig. 2,) which book is accessible to the salesmen, and the entry therein will be "298," indicating the page of the invoice-book from which it is taken and the number of invoice as shown on this page. The necessary entries will be made on line "1" of this book. Now on the article will be placed a tag or price-ticket containing the letter "A," indicating the cost-book in which the entries regarding this article will be found, and under the letter "A" will be entered the page (185) and the line (1), (see Fig. 5,) in which these entries will be found. This tag will contain also the price at which the article is to be sold. Now it will be apparent that this tag will form a key to the whole record of the case and will afford ready means by which it can be easily traced.

What I term the "invoice-record and cost book" is the first book of original entry. It is ruled, lined, lettered, page-numbered, as shown on page 298 in Fig. 1. The printing of the different article names, as heads of the various columns as therein shown, can be changed to fit the various businesses for which the invoice-record and cost book is to be used. The names of the leading articles forming the different departments can be printed according to the business under the letters designating the different cost-books, such as book A, B, and C in Figs. 2, 3, and 4.

My system of bookkeeping may apply as well by changing lines, ruling, lettering, figures, and characters to different lines of business, and the contents of original entry may be readily ascertained by means of the opening-key herein described.

In connection with the invoice-record and cost book I provide as many cost-books as there are departments in the establishment in which the books are used. After all invoices consisting of one item or more have been entered in the invoice-record and cost book the items will be copied into the various cost-books, the number limited only by the number of departments. I have shown but three for convenience—viz., books A, B, and C. These books will suffice to show how any number of books may be lettered, lined, ruled, page-numbered, &c.

I begin the invoice-record and cost book with the first invoice and enter it as "No. 1" in column under the heading "Invoice number" and continue consecutively numbering the invoices as entered. I have shown on page 298 several entries under invoices "No. 300," goods purchased from Marshall Field & Co. March 27, 1902. The invoice numbers entered in this column are also marked on the original invoices which they represent, and which ties the original invoice, after having passed to its proper place in invoice-cabinet, to the invoice-record and cost book. The invoice is entered just as originally made, line for line, as sent from the firm from whom it came, writing the quantity, name of article, and first cost price of each article as given in the original bill or invoice, putting each and every item on a separate and distinct numbered line by itself, writing the number or designating-letter of the articles in the column set aside for the purpose, with appropriate headings therefor, and writing "Quantity," "Yards," "Dozens," "Gross," or "Ms." in lettered columns set aside for the purpose. The total expension of the amount gained by multiplying the quantity with the price, be the article and the price whatever they may, is carried out into the various columns set apart therefor, which is headed by the letter corresponding with the cost-book of the department to which the goods belong, as shown in books A, B, and C.

A cost-book may, if desired, be used for each and every article carried by the establishment in which it is used. The "invoice-record and cost book" is for office reference and not for general salesmen, and should any article be bought under market value and a selling price made based upon market value the advance, being the difference paid for articles and its market value, can be put in column set aside for that special purpose in the invoice-record and cost books, and this advance can be added to the price paid and the real or market value can be put in column designated for that purpose. Then this cost price is to be carried forward to proper column of "Net first cost" in the cost-books when the cost-books are being made up from the invoice-record, and the actual amount paid for the goods will not be disclosed by the cost-books, but is only disclosed by a reference to the book of original entry—viz., invoice-record and cost book. Hence the salesmen will know nothing of these articles having been bought under value and will hold selling price at market value. The total footings are carried under each column headed by "Cost-book letters," this column showing the exact amount each department has bought during the week, month, or year. The totals of each invoice are carried to column for totals on each extreme right-hand side of page for that purpose, showing exact amount of all invoices entered during the week, month, or year. The footings of cost-book columns and column of totals must tally exactly as shown in extreme right-hand corner of page. When into the invoice-record and cost book has been copied all invoices, carefully segregating all the various items which constitute the several invoices and carrying the total amount gained by the addition of quantities by prices as given in the invoices to the various columns to which they belong, the book is then ready for use in drawing up the cost-books for the various departments. Into cost-book A is copied all the various entries, as shown in the column under the heading "Cost-book A," (and so on with all the other cost-books,) and copying the entry of each article separately, giving page-number of record-book as "298, invoice number 300," name of article, "Arnold shirtings," in column under heading " Article a," net first cost three and one-half, freight one-fourth, net landed cost three and three-fourths per yard, wholesale price five cents, and should the firm be doing retail business as well as wholesale make retail price six and one-half cents, putting all the above in columns set aside and designated by printed headlines for each item as enumerated, writing on straight line across the book from left to right.

Having described my invention, what I claim as new, and desire to secure by Letters Patent, is—

1. In the herein-described bookkeeping system, the combination of the herein-described invoice-record and cost book; a plurality of differently-designated cost-books, each cost-book being adapted for use in a separate department and having transcribed therein only such items of the invoice-record and cost books, giving the invoice number and page of said invoice-record and cost books, as refers to the articles for sale in such department, and price-tags for attachment to the articles for sale in said department, the said tags having marked thereon the selling price, also the page and line of the cost-book where the entries are made regarding such articles and the designating mark of its corresponding cost-book.

2. In a system of bookkeeping means to readily ascertain the actual cost of every article for sale in any establishment using the system, and not to disclose to the salesmen all matter relating thereto; said means comprising the combination of a book of original entries; a cost-book made from the book of original entries, the said cost-book having transcribed therein the invoice-number and the page of the book of original entries where each entry appears; and a price-tag for attachment to the article itself, giving selling price, together with the letter designating the cost-book with the page and line therein where the entries in relation to the article will be found.

3. A set of books for use in department stores, comprising a book of original entries, a cost-book made therefrom for each department, having transcribed therein entries relating to such items as are sold in the department for which it is made, the said cost-book giving the invoice-number and the page where the entries appear in the book of original entries; and a price-tag for attachment to the article to be sold, said tag having marked thereon the number or letter designating the cost-book from which the same is taken, together with the page and line of said cost-book and the selling price of said article.

4. Means to readily ascertain the cost of any article for sale in any establishment, comprising a book of original entries, containing all entries relating to the various articles for sale in the establishment; cost-books having a letter or number thereon to designate the same, for the use of the salesmen, containing all the entries which it is desired shall be disclosed to the salesmen, the cost-books having the invoice-number and references therein to the page of the original entry-book, where these entries are made; and a price-tag for attachment to the articles sold, the said tag having marked thereon the letter or number designating the cost-book and the page and line where the entries appear relating to such article and the selling price of the article.

In witness that I claim the foregoing I have hereunto subscribed my name this 20th day of October, 1902.

EDWIN E. CRANDALL.

Witnesses:
 HENRY T. HAZARD,
 G. E. HARPHAM.